April 9, 1957
C. O. WOOD
2,788,116
EXTENSIBLE CONVEYOR AND CONTROL CIRCUIT THEREFOR
Filed Feb. 29, 1956
2 Sheets-Sheet 1
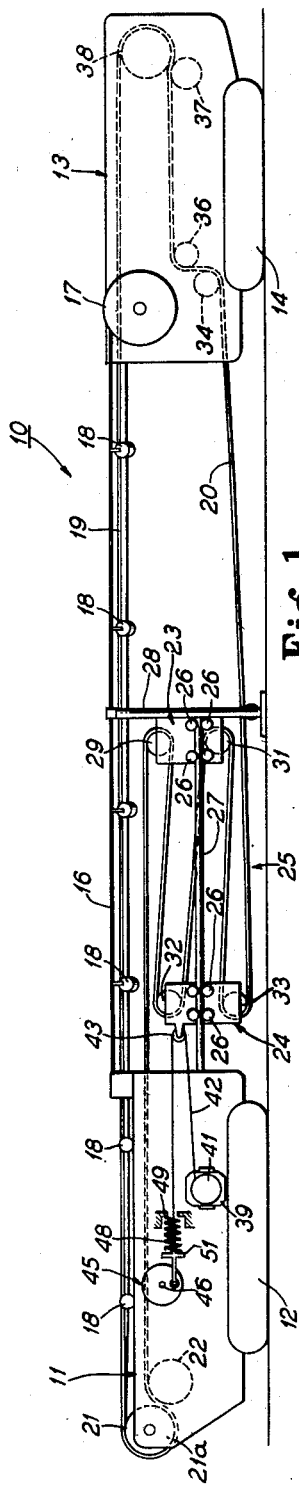
INVENTOR.
Claude O. Wood
BY
Murray A. Gleeson
ATTORNEY April 9, 1957  C. O. WOOD  2,788,116
EXTENSIBLE CONVEYOR AND CONTROL CIRCUIT THEREFOR
Filed Feb. 29, 1956  2 Sheets-Sheet 2

INVENTOR.
Claude O. Wood
BY
Murray A. Gleeson
ATTORNEY

United States Patent Office 2,788,116
Patented Apr. 9, 1957

2,788,116

EXTENSIBLE CONVEYOR AND CONTROL CIRCUIT THEREFOR

Claude O. Wood, Chicago, Ill., assignor to Goodman Manufacturing Company, Chicago, Ill., a corporation of Illinois Application February 29, 1956, Serial No. 568,514

7 Claims. (Cl. 198—139)

This invention relates generally to extensible conveyors and more particularly to an improved control circuit therefor whereby the conveyor belt of such conveyor can be extended both during movement of the belt and while it is stationary.

This invention represents an improvement over the extensible conveyor disclosed in an application of Craggs and McCann, Serial No. 548,622, filed November 23, 1955, for Extensible Conveyor. The structure of the aforesaid application includes head and tail sections having an endless conveyor belt extending therebetween, the conveying reach being driven at one of the sections, and the return reach thereof having a belt storage loop therein. Mean are employed for imposing tension on the return reach by moving a movable carriage of the belt storage loop by means of a motor driven winch which is operable in accordance with a desired amount of tension in the belt storage loop.

In such conveyors the tension in the upper or conveying reach is higher than in the return reach. When the driving motor for the conveying reach is inoperative and the belt is stationary the two reaches have the same tension value. Such tension value is generally greater than that usually permitted by the tension controlling means of the return reach during operation of the belt, and the tension maintaining means for the return reach will at such times tend to release the tension until its value is much too low, at times causing the return reach to sag unduly.

In order to prevent such undue sag the power means for the tensioning of the return reach is connected in a control circuit for the driving means for the conveying reach to make the tensioning means inoperative when the belt is stationary. Under conditions when the operator of the conveyor extends its length, an inordinate amount of tension may be placed on both the conveying and return reaches (since the belt tension means is inoperative) which at times could reach a value causing the belt to be stretched unduly or even broken. It is to the prevention of such a contingency that this invention is especially directed.

It is a principal object, therefore, to enable an extensible conveyor to be extended while the belt driving means is inoperative, and to provide a circuit for the control of the belt tensioning means which will make the belt tensioning means operable to release tension on the belt in excess of a predetermined value.

Other objects and important features of the invention will be apparent from a study of the specification following taken with the drawings which together describe and illustrate a preferred embodiment of the invention and what is now considered to be the best mode of practicing the principles thereof. Other embodiments of the invention will be suggested to those having the benefit of the teachings herein, and such other embodiments are intended to be reserved especially as they fall within the scope and spirit of the subjoined claims.

In the drawings:

Fig. 1 is a side elevation view of an extensible conveyor having the improvements according to the present invention embodied therein;

Fig. 2 is a circuit controlling the operation of the drive motor and the belt tensioning means of the extensible conveyor seen in Fig. 1;

Figure 3:
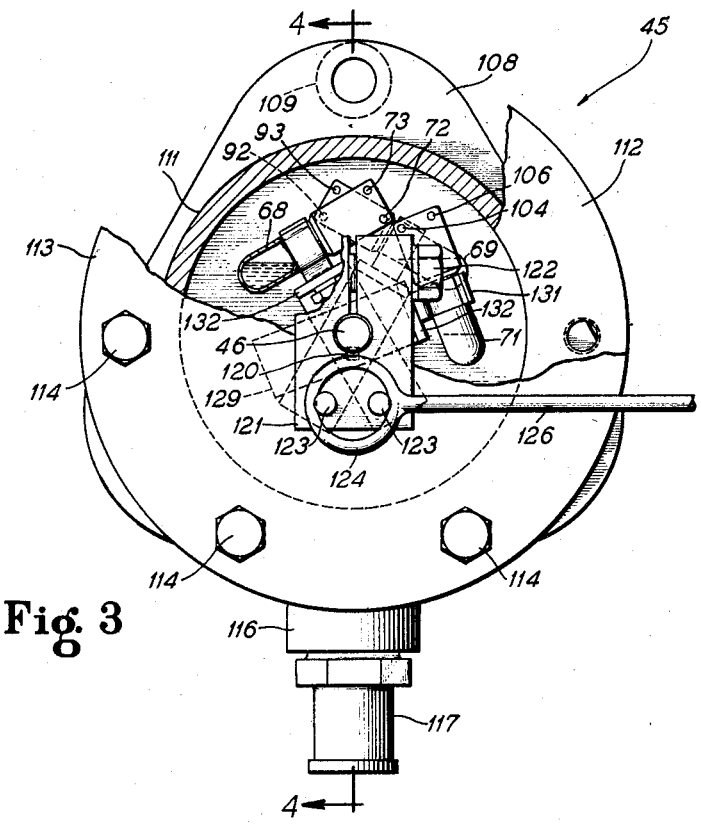
Fig. 3 is an elevational view of a switch housing for switches controlling the operation of the belt tensioning means of the extensible conveyor seen in Fig. 1.

Referring now to Fig. 1 of the drawings, the improvements according to the present invention are embodied in an extensible conveyor indicated generally by the reference numeral 10. Such a conveyor consists of a material discharging or head section 11 mounted upon crawler treads 12, and a material receiving or tail section 13 also mounted upon crawler treads 14. A pair of spaced flexible strands 16 span the distance between the head section 11 and the tail section 13, and each of said strands may be wound upon a take up winch 17 to impose the proper amount of tension thereon. A plurality of troughing roller assemblies 18 span the distance between the spaced flexible strands 16. The troughing roller assemblies 18 support the conveying reach 19 of an endless belt, said conveying reach 19 being driven by a driving roller 21 driven by a drive motor 21a at the head or discharge section, see also Fig. 2.

The spaced flexible strands 16 are preferably supported at intervals throughout their length by support standards, not shown, and as described in more detail in the aforesaid Cragg et al. application.

The endless belt includes a return reach 20 which is snubbed around a snubbing roller 22 at the head section 11. The return reach 20 is reeved at a belt storage loop indicated generally by the reference numeral 25 and consisting of a fixed carriage 23 and a movable carriage 24. Each of said carriages includes guide rollers 26 which are arranged to ride upon laterally spaced rails 27 extending from the head section 11 and to a support stand 28 located inby thereof.

The return reach 20 is reeved around idler rollers 29 and 31 on the fixed carriage 23, and idler rollers 32 and 33 at the movable carriage 24, the return reach being guided around idlers 34 and 36 at the tail section 13, and reversed in direction around a tail section idler pulley 38 at the tail section 13.

Each of the crawler treads 12 and 14 for the respective head and tail sections 11 and 13 are driven by tramming motors not shown.

Means are provided for imposing tension on the return reach 20 of the conveyor belt, and such means consists of a motor 39 driving a winch drum 41 having a cable 42 wrapped thereon. Cable 42 is trained around a sheave 43 mounted to the movable carriage 24, and the other end of the cable is connected at a switch housing 45 having a shaft 46 therein which is rocked in accordance with the tension in the cable 42 for a purpose as will appear.

Means are provided to control the rocking of the shaft 46 consisting of a spring 48 encircling the cable 42 and having one end bottomed against an abutment 49 on the headsection 11, and having its other end bearing against a movable abutment 51 on the cable 42. The spring 48 has its load set at a predetermined value, and its load urges the movable carriage 24 in a direction to impose tension upon the return reach 20. When a lower limit of tension has been reached in the cable 42, the shaft 46 will be rocked in a clockwise direction. Contrariwise, when the tension in the return reach 20 exceeds a predetermined value, the spring 48 will be compressed at the same time rocking the shaft 46 in a counterclockwise manner.

Rocking of the shaft 46 in a clockwise direction causes actuation of switches mounted thereon, and to be described, to cause the motor 39 to be driven in a direction to wind the cable 42 upon the winch drum 41, and rocking of the shaft 46 in a counterclockwise direction causes the motor 39 to be driven in the opposite direction to pay cable 42 from the drum 41.

Referring now to Fig. 2 of the drawings, the motors 21a and 39 are connected across a pair of power leads 52 and 53. Both of the motors are under the control of a main power switch 54 which is connected in a line having a relay 57 connected therein. Relay 57 is energized upon closing of switch 54 to close a main contact 58 connected in a line 59. When contact 58 is closed the motor 21a, consisting of a shunt field 61, an armature 62, and a series field 63 will be energized. The closing of switch 54 and the energization of relay 57 also closes a contact 60 for a purpose as will be described.

The automatic tensioning of the return reach 20 is under the control of a switch 64 which is closed to an automatic position upon a contact 66 connected in a common lead 67 to mercury switches 68, 69 and 71 mounted upon shaft 46 in the housing 45.

When the tension in the return reach 20 is lower than a predetermined value as determined by the load in spring 48, the shaft 46 will be rotated in a clockwise direction, causing the mercury in switch 68 to close contacts 72 and 73 thereof.

Upon closing of contacts 72 and 73 a circuit will be completed including a lead 74 having connected therein a normally closed contact 76 and a relay winding 78. When relay winding 78 is energized, it will cause a contact 79 to close, thereby energizing a relay winding 81 connected in a lead 82. When relay winding 81 is energized contact 83 connected in a lead 84 to the motor 39 will close.

Concomitant with the energization of the relay winding 78, a pair of contacts 86 and 87 will close, causing a circuit to be made in one direction through an armature 39a of the motor 39 and through a series field 88 of the motor 39. A shunt field 89 and a brake solenoid 91 are closed upon closing of the contact 83. The motor 39, it may be noted, is of the type which has a brake preventing rotation of the armature when the motor is deenergized, the brake being controlled by the solenoid 91 to release the brake when the motor is energized. Such brakes are well known in the art and so need not be described in further detail.

When the motor is thus energized, the winch drum 41 will be rotated in a direction to impose tension upon the cable 42 and rock the shaft 46 in a counterclockwise direction and open contacts 72 and 73 to deenergize the circuit through motor 39 and its control relays 78 and 81.

Conversely, when the tension in the return reach 20 is in excess of a predetermined amount as determined by the spring 48, the switch supporting shaft 46 will be rotated in a counterclockwise direction to cause the mercury of switch 69 to close upon contacts 92 and 93, said contacts being connected in the lead 67 and in a lead 94 having the contact 60 therein which is closed upon operation of the master switch 54.

The closing of the contacts 92 and 93 energizes a circuit including a lead 97, normally closed contact 98 of relay 78, and the winding of a relay 99. When the relay 99 is energized it closes a contact 101 to energize the relay 81 as before, and close its associated contact 83 as before.

When relay winding 99 is energized it will close contacts 102 and 103 to reverse the direction of the current through the armature 39a thereby causing the motor to operate in the reverse direction and pay cable 42 from the winding drum 41. The tension in the spring 48 will thus be released, causing the switch supporting shaft 46 to rock in a clockwise direction and open the contacts 92 and 93, thereby deenergizing the control relays described and the circuit through the motor 39.

As has been described in connection with the objects of this invention, the automatic tensioning of the return reach 20 is made inoperative when the drive motor 21a is deenergized by opening the master switch 54. This causes relay winding 57 to be deenergized, opening the main contact 58 to the motor, and the contact 60 controlled by the relay 57. When contact 60 is open the automatic tensioning means including the switch 69 is ineffective to release the tension on the return reach 20.

If the conveyor 10 is extended while the belt is not operating, the tension on the belt may reach a value in excess of a desired amount. Accordingly, means are provided to enable the automatic tensioning means to reduce the tension in the belt during such extensible movement of the conveyor. The excessive tension in the return reach 20 causes the switch supporting shaft 46 to rotate in a counterclockwise direction as will readily be understood.

Such counterclockwise rotation under the condition of tension in excess of a predetermined amount causes the switch 71 to rotate in the same direction to cause it to close, and the means for preventing the increase in tension of the return reach under the condition described in excess of such amount includes the switch 71 having a pair of contacts 104 and 106 connected in series with the lead 67, and with the lead 97 to cause the motor 39 to be energized to pay out cable from the drum 42. The circuit in such case includes closed contact 98 and relay 99 to close contact 101 and energize relay 81. The remainder of the circuit is the same as for releasing tension while the belt is operating.

Means are also provided whereby the tension on the return reach 20 may also be lessened without regard to the automatic tensioning means as desired, and accordingly the switch 64 can be closed upon a contact 107 connected to the lead 97, thereby releasing the tension by operation of the motor 39 in the manner described. Such manually operated release of the belt tension is indicated where a new length of belt is to be inserted.

Figure 4:
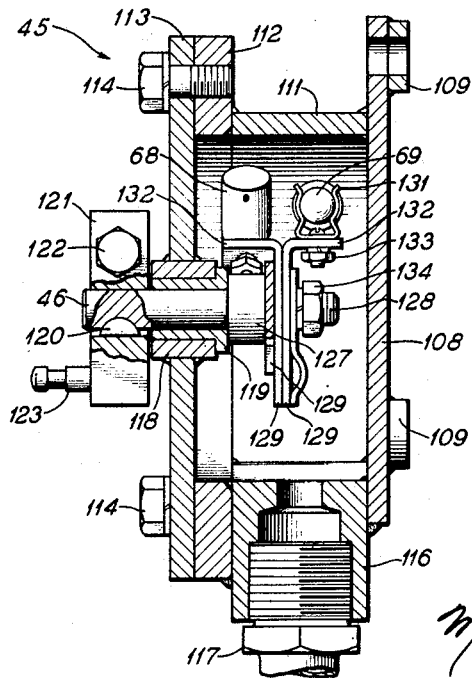
Fig. 4 is a section taken along the line 4—4 of Fig. 3 looking in the direction of the arrows, certain parts being shown in elevation.

Referring now to Figs. 3 and 4, the switch housing 45 includes a mounting plate 108 having mounting bosses 109 therefor. A generally annular shaped flange 111 extends from the mounting plate 108 and has a circular rim 112 to which is held a cover plate 113 by means of cap screws 114. The generally circular flange 111 has a radial boss 116 extending therefrom which is tapped to receive a fitting 117 enclosing power leads to the switches 68, 69 and 71 enclosed within the housing 45.

The cover plate 113 has a cylindrical support 118 therein for a bushing 119 for the shaft 46. The shaft 46 is fitted with a split clamp 121 adjusted thereon by a clamping screw 122 and indexed to proper position by a key 120.

A pair of pins 123 extend from the clamp 121 and are embraced by a closed yoke 124 connected by an extension therefrom 126 to the cable 42 in any convenient manner.

The shaft 46 extends within the switch housing 45, and has an upset portion 127 and a threaded extension 128 therefrom. The threaded extension 128 has fitted thereon L-shaped supports 129 for the switches 68, 69 and 71, each switch being held in a clip 131 secured to an arm 132 of the L-shaped support by means of the bolts 133 shown.

As seen in Fig. 4 each of the supports 129 may be indexed to proper position on the shaft 46 and held in place by means of a locking nut 134.

It will be seen that the closed yoke 124 will rock the shaft 46 in the manner as previously described to operate the mercury switches enclosed within the housing 45.

While the invention has been described in terms of a preferred embodiment thereof, its scope is intended to be limited only by the claims here appended.

I claim as my invention:

1. In an extensible conveyor, head and tail sections, an endless conveyor belt having conveying and return reaches extending between said sections, a motor for driving said endless belt, a belt storage loop in said return reach for paying out additional lengths of belt upon increase in length of said conveyor, a motor for placing tension on said belt storage loop, and a control circuit for said motors including switches connected therein and responsive to the tension in said belt storage loop for controlling the operation of said second motor, separate switch means controlling said first motor, circuit opening means controlled by said switch means for rendering said second motor inoperative in a direction to release tension on said belt storage loop when said switch means is actuated to render said first motor inoperative, and additional circuit means operable when said first named motor is inoperative and the tension in said storage loop is in excess of a predetermined value for causing said second motor to operate in a direction to relieve the tension on said storage loop.

2. In an extensible conveyor, head and tail sections, an endless conveyor belt having conveying and return reaches extending between said sections, a motor for driving said endless belt, a belt storage loop in said return reach for paying out additional lengths of belt upon increase in length of said conveyor, a motor for placing tension on said belt storage loop, and a control circuit for said motors including circuit means connected therein and responsive to the tension in said belt storage loop for controlling the operation of said second motor, a switch controlling said first motor, means controlled by said switch for rendering said second motor inoperative when said switch is actuated to render said first motor inoperative, and additional circuit means operable when said first named motor is inoperative and the tension in said storage loop is in excess of a predetermined value for causing said second motor to operate in a direction to relieve the tension on said storage loop.

3. In an extensible conveyor, head and tail sections, an endless conveyor belt having conveying and return reaches extending between said sections, a motor for driving said endless belt, a belt storage loop in said return reach for paying out additional lengths of belt upon increase in length of said conveyor, a motor for placing tension on said belt storage loop, and a control circuit for said motors including switches connected therein and actuated in response to the tension in said belt storage loop for controlling the operation of said second motor, a separate switch means controlling said first motor, means controlled by said switch means for rendering said second motor inoperative when said switch means is actuated to render said first motor inoperative, and additional circuit means operable when said first named motor is inoperative and the tension in said storage loop is in excess of a predetermined value for causing said second motor to operate in a direction to relieve the tension on said storage loop.

4. In an extensible conveyor, head and tail sections, an endless conveyor belt having conveying and return reaches extending between said sections, a motor for driving said endless belt, a belt storage loop in said return reach for paying out additional lengths of belt upon increase in length of said conveyor, a motor for placing tension on said belt storage loop, and a control circuit for said motors including circuit means connected therein and responsive to the tension in said belt storage loop for controlling the operation of said second motor, a switch controlling said first motor, means controlled by said switch for rendering said second motor inoperative when said switch is actuated to render said first motor inoperative, and an additional switch operable when said first named motor is inoperative and the tension in said storage loop is in excess of a predetermined value for causing said second motor to operate in a direction to relieve the tension on said storage loop.

5. In an extensible conveyor, head and tail sections, an endless conveyor belt having conveying and return reaches extending between said sections, a motor for driving said endless belt, a belt storage loop in said return reach for paying out additional lengths of belt upon increase in length of said conveyor, a motor for placing tension on said belt storage loop, and a control circuit for said motors including circuit means connected therein and responsive to the tension in said belt storage loop for controlling the operation of said second motor in directions to relieve or take up tension in said belt storage loop, a switch controlling said first motor, means controlled by said switch for rendering said second motor inoperative when said switch is actuated to render said first motor inoperative, and additional circuit means operable when said first named motor is inoperative and the tension in said storage loop is in excess of a predetermined value for causing said second motor to operate in a direction to relieve the tension on said storage loop.

6. In an extensible conveyor, head and tail sections, an endless conveyor belt having conveying and return reaches extending between said sections, a motor for driving said endless belt, a belt storage loop in said return reach for paying out additional lengths of belt upon increase in length of said conveyor, a motor for placing tension on said belt storage loop, and a control circuit for said motors including switch means connected therein and responsive to the tension in said belt storage loop for controlling the operation of said second motor, a switch controlling said first motor, means controlled by said switch for rendering said second motor inoperative when said switch is actuated to render said first motor inoperative, and an auxiliary switch operable when said first named motor is inoperative and the tension in said storage loop is in excess of a predetermined value for causing said second motor to operate in a direction to relieve the tension on said storage loop.

7. In an extensible conveyor, head and tail sections, an endless conveyor belt having conveying and return reaches extending between said sections, a motor for driving sasid endless belt, a belt storage loop in said return reach for paying out additional lengths of belt upon increase in length of said conveyor, a motor for placing tension on said belt storage loop, and a control circuit for said motors including switches connected therein and responsive to the tension in said belt storage loop for controlling the operation of said second motor, separate switch means controlling said first motor, and circuit opening means controlled by said switch means for rendering said second motor inoperative when said switch means is actuated to render said first motor inoperative.

References Cited in the file of this patent
UNITED STATES PATENTS 2,725,976    Madeira                Dec. 6, 1955